(12) United States Patent
Quintero

(10) Patent No.: US 10,157,235 B2
(45) Date of Patent: Dec. 18, 2018

(54) AUTOMATIC GROUPING OF BROWSER BOOKMARKS

(71) Applicant: Microsoft Technology Licensing, LLC, Redmond, WA (US)

(72) Inventor: Megan Marie Quintero, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 402 days.

(21) Appl. No.: 14/788,744

(22) Filed: Jun. 30, 2015

(65) Prior Publication Data

US 2017/0004220 A1   Jan. 5, 2017

(51) Int. Cl.
| | |
|---|---|
| *G06F 7/00* | (2006.01) |
| *G06F 17/30* | (2006.01) |
| *G06F 3/0482* | (2013.01) |
| *G06F 3/0484* | (2013.01) |
| *H04L 29/08* | (2006.01) |

(52) U.S. Cl.
CPC ...... *G06F 17/30884* (2013.01); *G06F 3/0482* (2013.01); *G06F 3/0484* (2013.01); *G06F 17/30598* (2013.01); *H04L 67/02* (2013.01)

(58) Field of Classification Search
CPC ......... G06F 17/30884; G06F 17/30598; G06F 3/0482; G06F 3/0484; H04L 67/02
See application file for complete search history.

(56) References Cited

U.S. PATENT DOCUMENTS

| | | | |
|---|---|---|---|
| 6,211,871 B1 | 4/2001 | Himmel et al. | |
| 6,275,862 B1 | 8/2001 | Sharma et al. | |
| 7,424,476 B2 | 9/2008 | Apparao et al. | |
| 7,702,675 B1 | 4/2010 | Khosla et al. | |
| 8,010,532 B2 | 8/2011 | Chi et al. | |
| 8,239,367 B1 | 8/2012 | Zamir et al. | |
| 8,533,199 B2 | 9/2013 | Malla | |
| 8,843,829 B2 | 9/2014 | Hussain et al. | |
| 2002/0184095 A1 | 12/2002 | Scullard et al. | |
| 2004/0216057 A1* | 10/2004 | Wyle | G06F 17/30017 715/810 |
| 2008/0168340 A1 | 7/2008 | Jang | |
| 2009/0144240 A1* | 6/2009 | Singh | G06F 17/30864 |

(Continued)

FOREIGN PATENT DOCUMENTS

WO    2014064713 A1    5/2014

OTHER PUBLICATIONS

Feng, et al., "Using Semantic Treemaps to Categorize and Visualize Bookmark Files", In Proceedings of the SPIE Conference on Visualization and Data Analysis, Jan. 20, 2002, 10 pages.

(Continued)

*Primary Examiner* — Azam Cheema

(74) *Attorney, Agent, or Firm* — Arent Fox LLP

(57) ABSTRACT

In one embodiment, a user device may organize the user bookmark list into a set of categories automatically. The user device may represent a website as a user bookmark. Memory of the user device may associate the user bookmark with the descriptive entity data set for the website. A processing core of the user device may categorize the user bookmark at a view layer based on the descriptive entity data set upon each presentation of a user bookmark list to a user. An output device of the user device may present the user bookmark list to a user.

19 Claims, 9 Drawing Sheets

(56) References Cited

U.S. PATENT DOCUMENTS

| | | |
|---|---|---|
| 2013/0110869 A1 | 5/2013 | Weber et al. |
| 2013/0297827 A1 | 11/2013 | Guan et al. |
| 2013/0311497 A1 | 11/2013 | Jang |
| 2014/0108901 A1* | 4/2014 | Carriero ............ G06F 17/30884 |
| | | 715/206 |
| 2014/0258442 A1 | 9/2014 | Davis et al. |
| 2015/0089378 A1* | 3/2015 | Pan ..................... G06F 3/04817 |
| | | 715/739 |

OTHER PUBLICATIONS

Benz, et al., "Automatic Bookmark Classification: A Collaborative Approach", In Proceedings of the Second Workshop on Innovations in Web Infrastructure, May 22, 2006, 8 pages.

"International Search Report and Written Opinion Issued in PCT Application No. PCT/US2016/039470", dated Aug. 23, 2016, 14 Pages.

"International Preliminary Report on Patentability Issued in PCT Application No. PCT/US2016/039470", dated May 15, 2017, 12 Pages.

"Second Written Opinion Issued in PCT Application No. PCT/US2016/039470", dated Feb. 13, 2017, 11 Pages.

\* cited by examiner

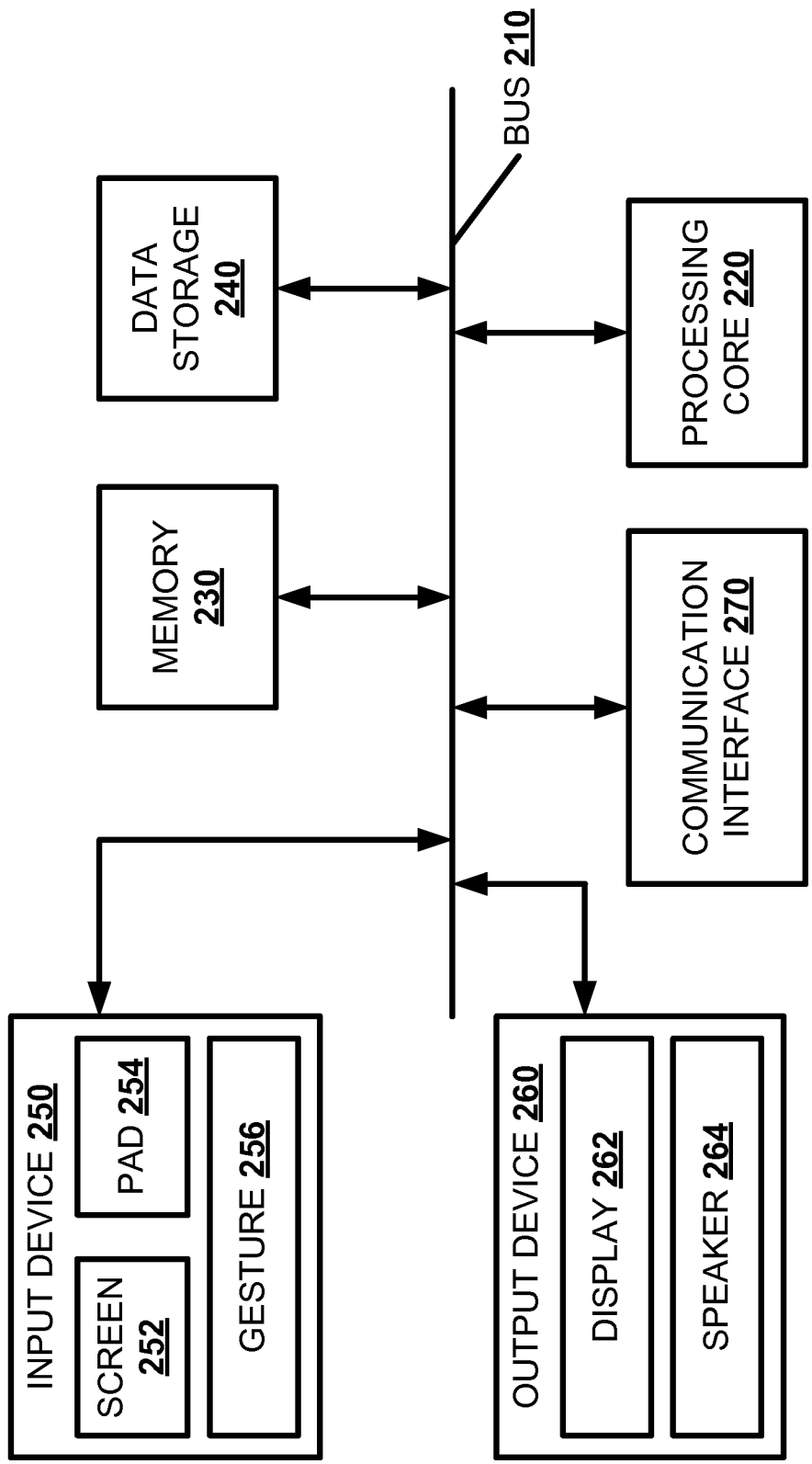

400

| USER ID 510 | DEVICE ID 520 | WEBSITE ID 530 | DOMAIN ID 540 | ENTITY DATA SET 550 | | USAGE HISTORY 560 |
|---|---|---|---|---|---|---|
| | | | | DESCRIPTOR 552 | WEIGHT 554 | |
| | | | | DESCRIPTOR 552 | WEIGHT 554 | |

AUTOMATIC GROUPING OF BROWSER BOOKMARKS

BACKGROUND

Previously, a user could use a browser to maintain a bookmark list storing a set of bookmarks representing preferred websites for a user. The user may identify a website when browsing the website as a favorite website. The browser may then store a link or uniform resource locator to the website as a bookmark. The user may then group the bookmarks according to a user criteria. The bookmarks may be stored in a file and folder tree structure.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

Embodiments discussed below relate to organizing the user bookmark list into a set of categories automatically. The user device may represent a website as a user bookmark. Memory of the user device may associate the user bookmark with a descriptive entity data set for the website. A processing core of the user device may categorize the user bookmark at a view layer based on the descriptive entity data set upon each presentation of a user bookmark list to a user. An output device of the user device may present the user bookmark list to the user.

DRAWINGS

In order to describe the manner in which the above-recited and other advantages and features can be obtained, a more particular description is set forth and will be rendered by reference to specific embodiments thereof which are illustrated in the appended drawings. Understanding that these drawings depict only typical embodiments and are not therefore to be considered to be limiting of its scope, implementations will be described and explained with additional specificity and detail through the use of the accompanying drawings.

FIG. 2 illustrates, in a block diagram, one embodiment of a computing device.

Figure 3A:
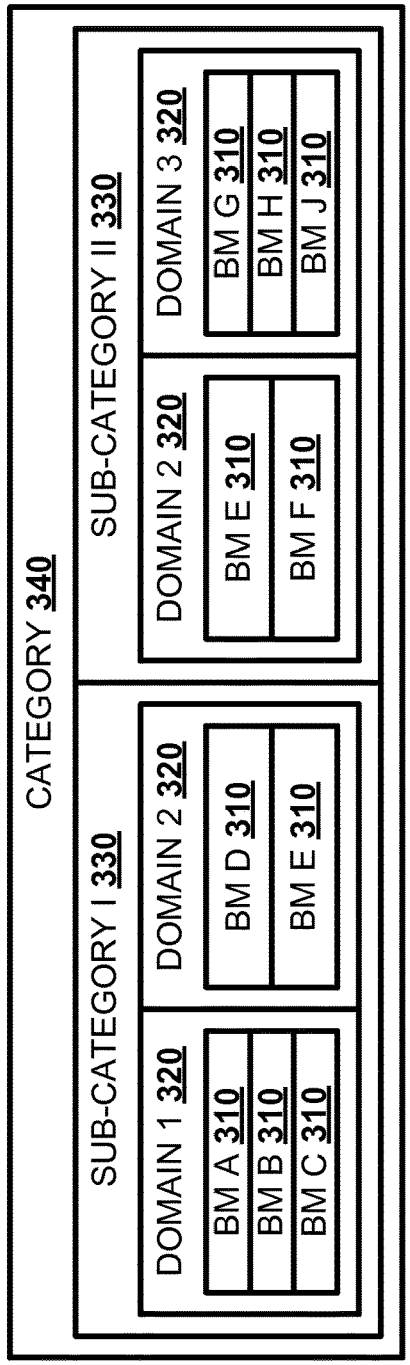
Figure 3B:
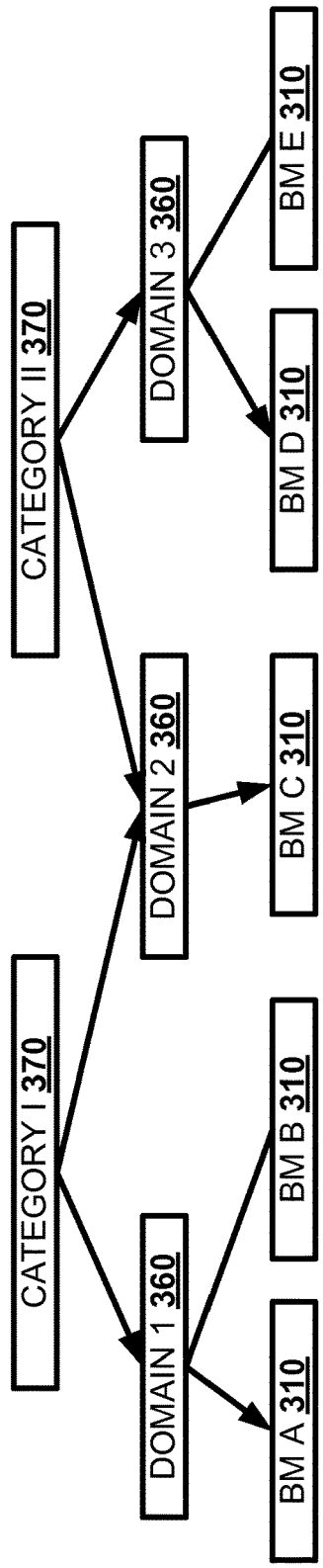

FIG. 3a-b illustrate, in block diagrams, embodiments of bookmark storage structure.

Figure 4:
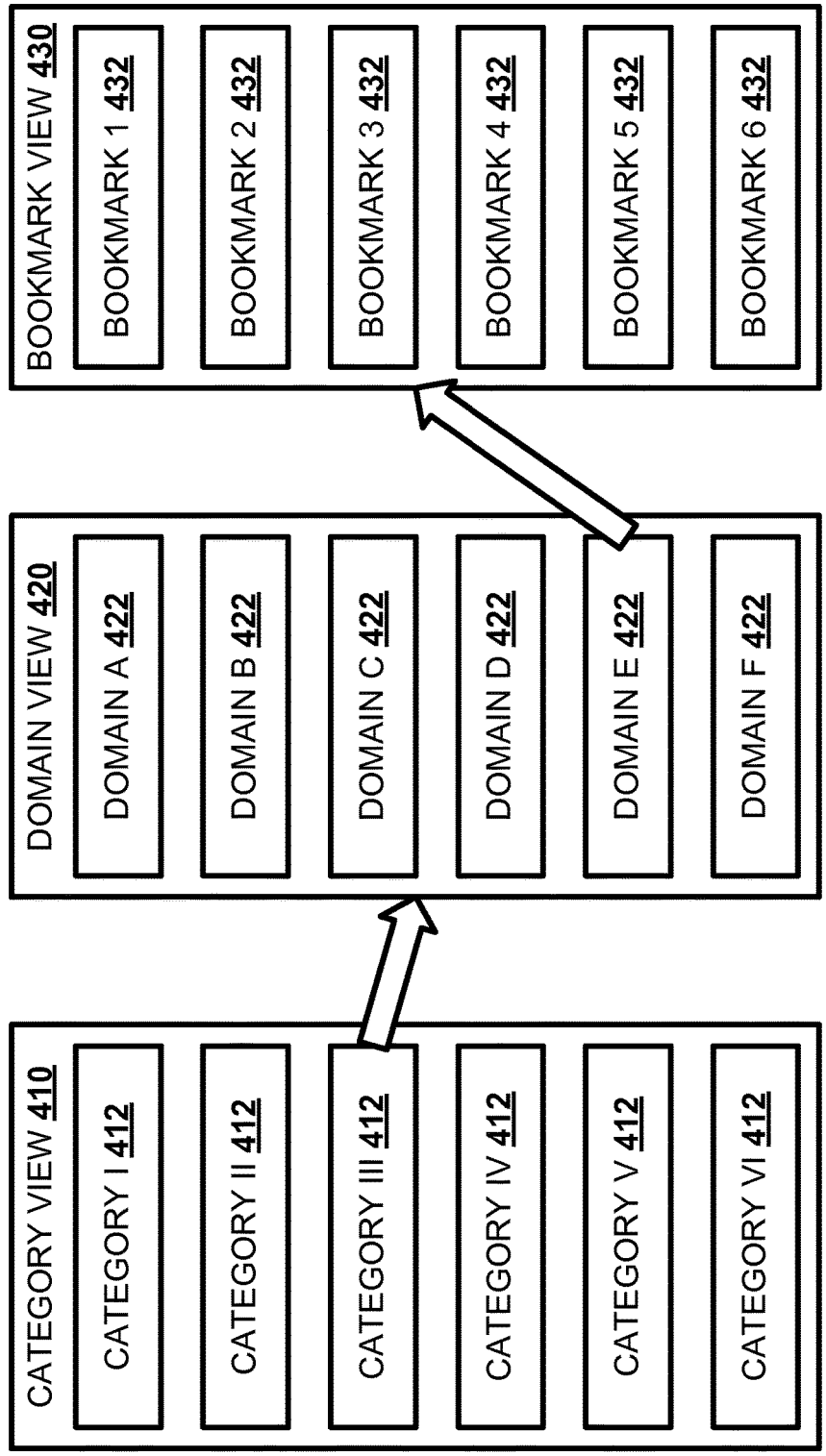

FIG. 4 illustrates, in a block diagram, one embodiment of a user view of a user bookmark list.

FIG. 5 illustrates, in a block diagram, one embodiment of a bookmark record.

Figure 6:
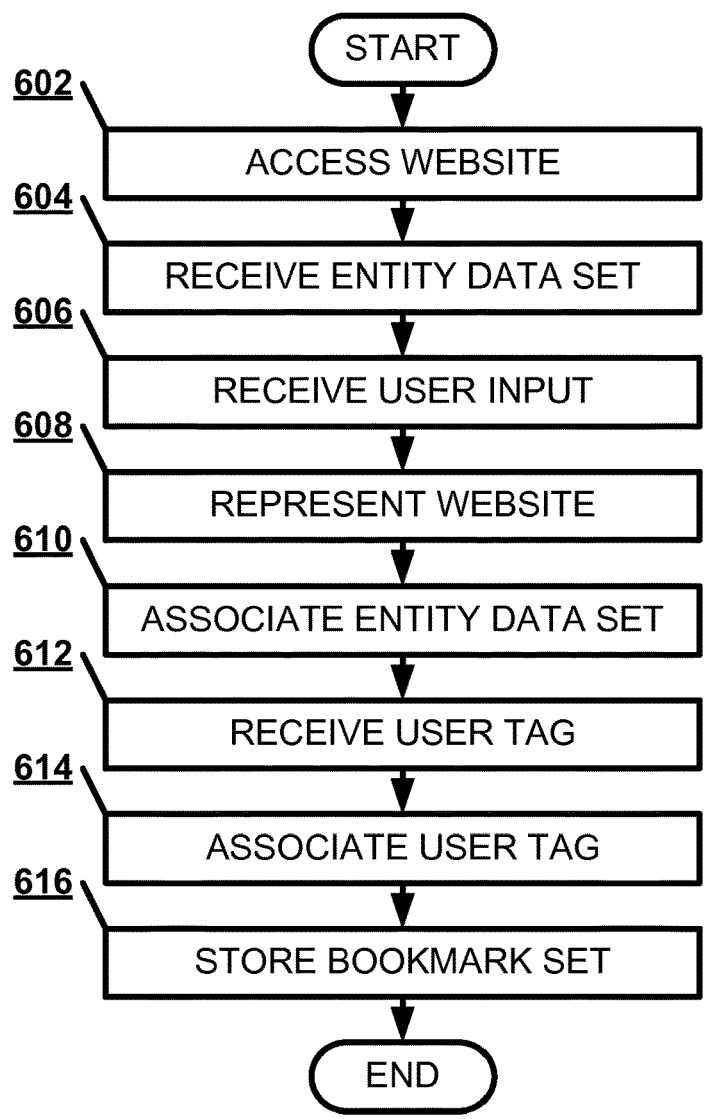

FIG. 6 illustrates, in a flowchart, one embodiment of a method for saving a user bookmark.

Figure 7:
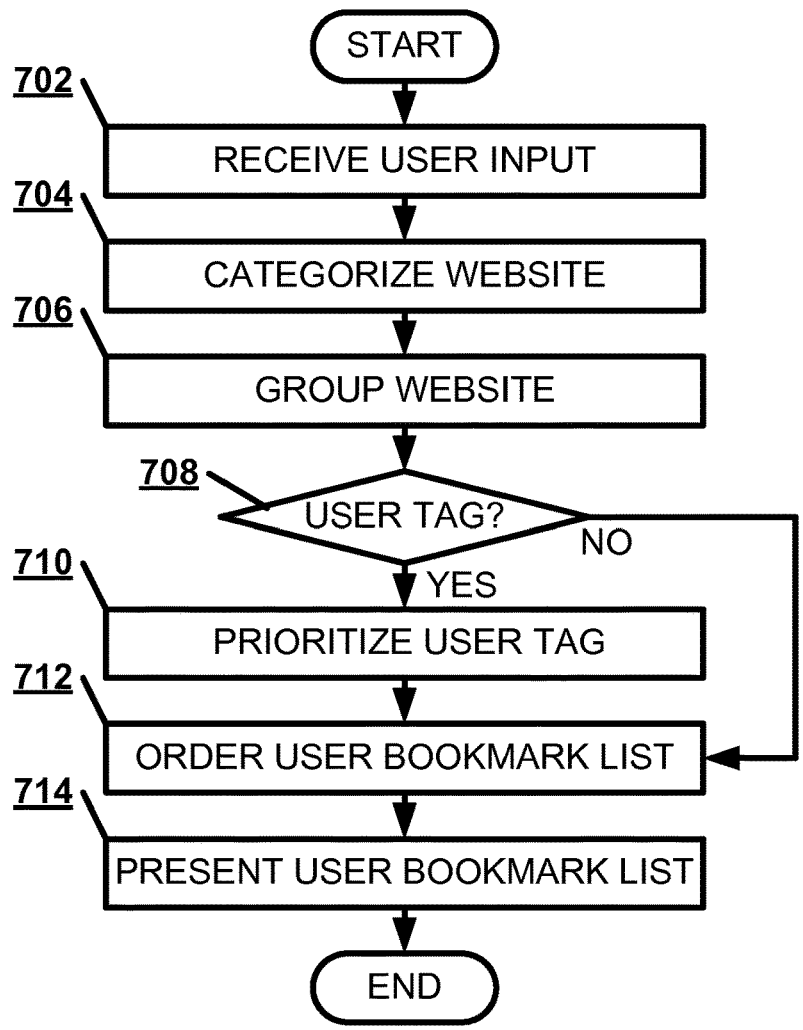

FIG. 7 illustrates, in a flowchart, one embodiment of a method for grouping a user bookmark.

Figure 8:
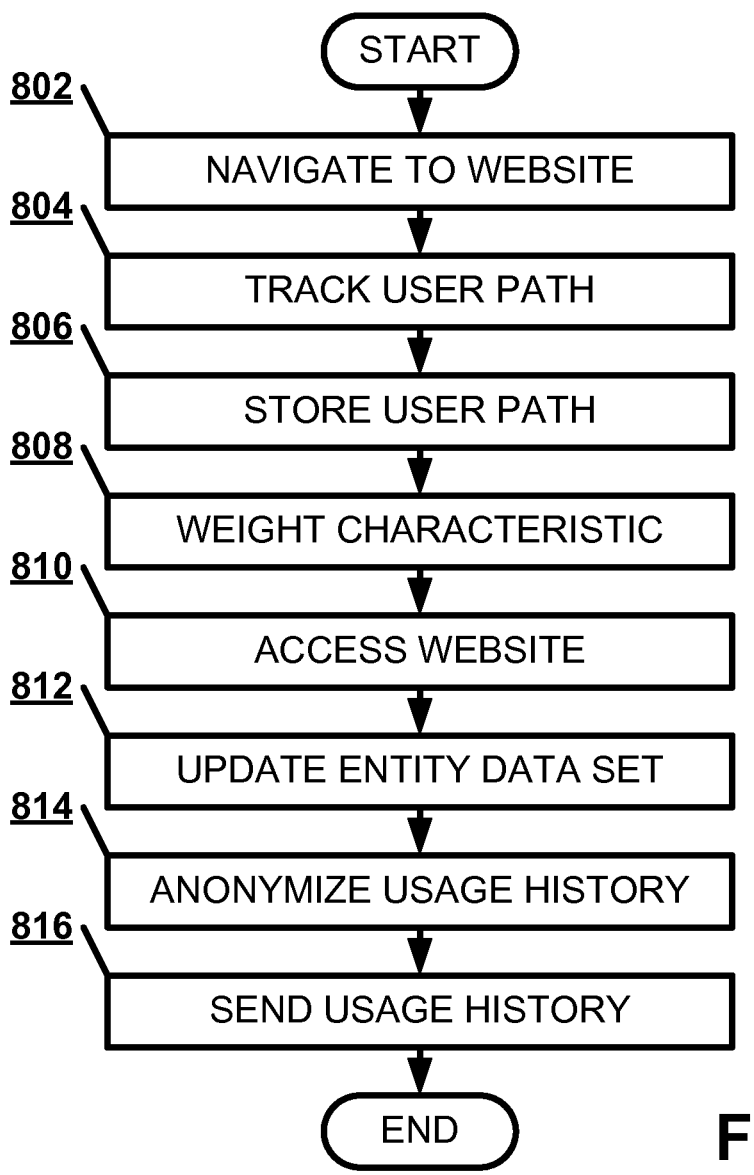

FIG. 8 illustrates, in a flowchart, one embodiment of a method for tracking a bookmark navigation.

Figure 9:
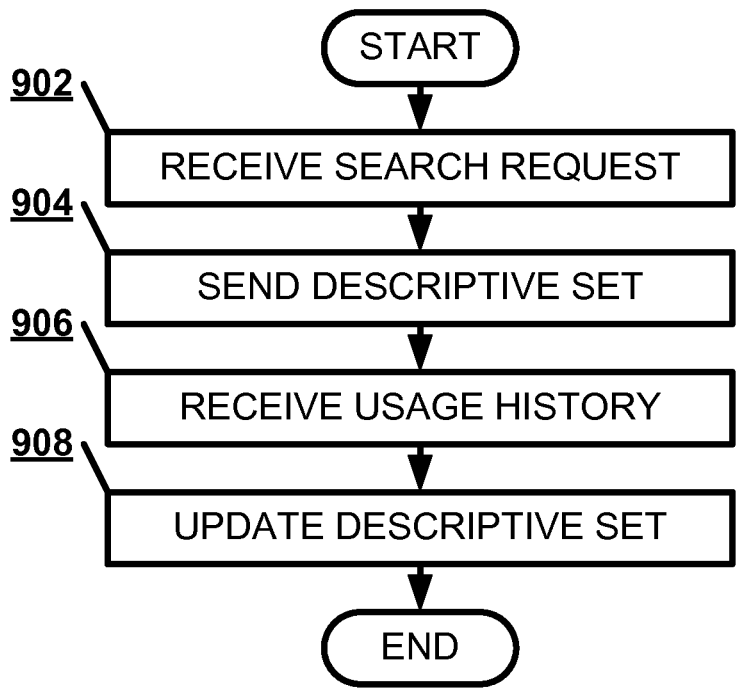

FIG. 9 illustrates, in a flowchart, one embodiment of a method for updating a descriptive entity data set at the search engine.

DETAILED DESCRIPTION

Embodiments are discussed in detail below. While specific implementations are discussed, it should be understood that this is done for illustration purposes only. A person skilled in the relevant art will recognize that other components and configurations may be used without parting from the spirit and scope of the subject matter of this disclosure. The implementations may be a network browsing device, a computing device, or a machine-implemented method.

In one embodiment, a user device may organize the user bookmark list into a set of categories automatically. The user device may represent a website as a user bookmark. A communication interface of the user device may receive a descriptive entity data set formulated by a search engine. Memory of the user device may associate the website with the descriptive entity data set. A processing core of the user device may categorize the website at a view layer based on the descriptive entity data set upon each presentation of a user bookmark list to a user. An input device of the user device may receive a user category tag from the user to assign a user generated category or a user specified category to the bookmark. An output device of the user device may present the user bookmark list to the user. The processing core of the user device may navigate to the website in the user bookmark list using an association characteristic navigation.

A user bookmark list for a browser, or an application that accesses a webpage over the internet in a manner similar to a browser, may be unwieldy without organization. A user may create a folder and spatially move bookmark content to the folder. The user may edit a tide name for a user bookmark with a character, such as "!" or "*", to indicate importance. The user may scan content visually in hopes of finding a desired uniform resource locator. Additionally, the visual interface that the user interacts with may show the title name of the favorite and no high level information such as domain or site type. The browser may place the onus on the user to create a folder to store like content.

The browser may categorize content by a page type based on a descriptive entity data set describing a web page, possibly provided by a search engine. If no information is available, the browser may place the content in an "other" or "misc" bucket. The browser then may group the content by domain. The browser may include the proper uniform resource locator parsing to group together websites from the same domain appropriately.

The browser may use a descriptive entity data set to automatically group content by site type. The browser may group a set of user bookmarks by domain by truncating the uniform resource locator to a key domain name. The browser may use an association characteristic navigation structure to access the bookmarks instead of a standard file and folder tree structure, allowing a user device to access a single bookmark via multiple different categories.

Figure 1:
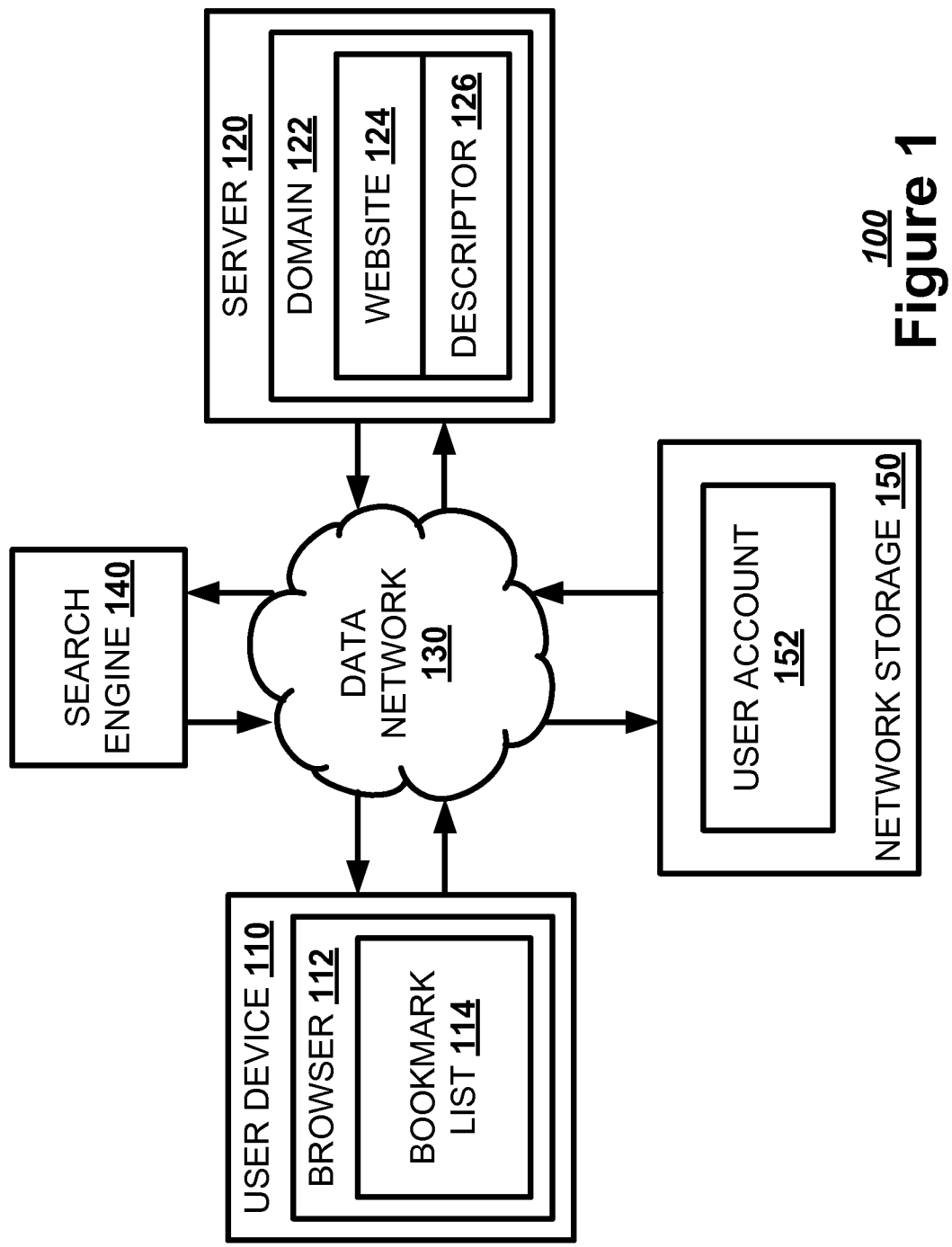
FIG. 1 illustrates, in a block diagram, one embodiment of a data network.

FIG. 1 illustrates, in a block diagram, one embodiment of a data network 100. A user device 110 may implement a browser 112, or similar communication application, to access a website server 120 via a data network connection 130. The website server 120 may present a domain 122 that provides one or more websites 124. A domain 122 is an autonomous group of linked websites 124, such as Macys.com or warnerbros.com. A website 124 is a discrete set of hypertext data that may be visually presented to a user. The website server 120 may be implemented on a single server or a distributed set of servers, such as a server farm. The data network connection 130 may be an internet connection, a wide area network connection, a local area network connection, or other type of data network connections.

The browser 112 may use a search engine 140 to find the website 124. The search engine 140 may apply a characteristic descriptor 126 to the website 124 to categorize the website 124. The website server 120 may associate one or more characteristic descriptors 126 provided by the search engine 140 with the website 124 as a descriptive entity data set. When the browser 112 bookmarks the website 124, the browser 112 may download the characteristic descriptor 126 from the website server 120 or the search engine 140. The browser 112 may use that characteristic descriptor 126 from the search engine 140 to categorize the bookmark for the website 124 in a user bookmark list 114.

The browser 112 may store the user bookmark list 114 in a network storage 150 under a user account 152 associated with a user of the user device 110. A different user device associated with the same user account 152 may then download the user bookmark list 114. Thus, the user may synchronize the user bookmark list 114 across multiple user devices.

FIG. 2 illustrates a block diagram of an exemplary computing device 200 which may act as a network browsing device, a server, or a search engine. The computing device 200 may combine one or more of hardware, software, firmware, and system-on-a-chip technology to implement a network browsing device, a server, or a search engine. The computing device 200 may include a bus 210, a processing core 220, a memory 230, a data storage 240, an input device 250, an output device 260, and a communication interface 270. The bus 210, or other component interconnection, may permit communication among the components of the computing device 200.

The processing core 220 may include at least one conventional processor or microprocessor that interprets and executes a set of instructions. The processing core 220 may be configured to categorize a user bookmark at a view layer based on the descriptive entity data set and, possibly, a user category tag upon each presentation of a user bookmark list to a user. Categorizing at a view layer provides grouping of user bookmarks during presentation without changing the underlying storage structure, allowing a user device to associate a single instance of the user bookmark with multiple category tags. Further, by categorizing at the view layer, the browser may ensure that the categorization data is as fresh and accurate as possible. The processing core 220 further may be configured to group the user bookmark list based on a domain of the website. The processing core 220 also may be configured to prioritize the user bookmark having a user category tag in a list order of the user bookmark list. The processing core 230 further may be configured to order user bookmarks in a category based on a descriptor weight. The processing core 220 additionally may be configured to navigate to the user bookmark in the user bookmark list using an association characteristic navigation.

The memory 230 may be a random access memory (RAM) or another type of dynamic data storage that stores information and instructions for execution by the processing core 220. The memory 230 may also store temporary variables or other intermediate information used during execution of instructions by the processing core 220. The memory 230 may be configured to associate the user bookmark with a descriptive entity data set for the website represented by the user bookmark. The descriptive entity data set is a set of one or more characteristic descriptors describing an aspect of a website. The memory 230 may further be configured to associate the user bookmark with a user category tag provided by the user to indicate a preferred category for a website. The memory 230 also may be configured to track a user path to the user bookmark in the user bookmark list to create a bookmark usage history. The memory 230 additionally may be configured to weight a characteristic descriptor based on a book mark usage history.

The data storage 240 may include a conventional ROM device or another type of static data storage that stores static information and instructions for the processing core 220. The data storage 240 may include any type of tangible machine-readable medium, such as, for example, magnetic or optical recording media, such as a digital video disk, and its corresponding drive. A tangible machine-readable medium is a physical medium storing machine-readable code or instructions, as opposed to a signal. Having instructions stored on computer-readable media as described herein is distinguishable from having instructions propagated or transmitted, as the propagation transfers the instructions, versus stores the instructions such as can occur with a computer-readable medium having instructions stored thereon. Therefore, unless otherwise noted, references to computer-readable media/medium having instructions stored thereon, in this or an analogous form, references tangible media on which data may be stored or retained. The data storage 240 may store a set of instructions detailing a method that when executed by one or more processors cause the one or more processors to perform the method. The data storage 240 may also be a database or a database interface for storing a user bookmark list.

The input device 250 may include one or more conventional mechanisms that permit a user to input information to the computing device 200, such as a keyboard, a mouse, a voice recognition device, a microphone, a headset, a touch screen 252, a touch pad 254, a gesture recognition device 256, etc. The input device 250 may be configured to receive a user input identifying a website as a user bookmark. The output device 260 may include one or more conventional mechanisms that output information to the user, including a display screen 262, a printer, one or more speakers 264, a headset, a vibrator, or a medium, such as a memory, or a magnetic or optical disk and a corresponding disk drive. The output device 260 may be configured to present a user bookmark list to a user.

The communication interface 270 may include any transceiver-like mechanism that enables computing device 200 to communicate with other devices or networks. The communication interface 270 may include a network interface or a transceiver interface. The communication interface 270 may be a wireless, wired, or optical interface. The communication interface 270 may be configured to receive a descriptive entity data set formulated by a search engine from the search engine or from a website server. The communication interface 270 further may be configured to receive an update to the descriptive entity data set for the user bookmark upon accessing the website. The communication interface 270 also may be configured to store a user bookmark list in a network storage. The communication interface 270 may be configured to send a bookmark usage history to a search engine to update the descriptive entity data set for the website.

The computing device 200 may perform such functions in response to processing core 220 executing sequences of instructions contained in a computer-readable medium, such as, for example, the memory 230, a magnetic disk, or an optical disk. Such instructions may be read into the memory 230 from another computer-readable medium, such as the data storage 240, or from a separate device via the communication interface 260.

Upon visiting a website, a user may indicate that the website is a favorite website. The user device may add a user bookmark representing the website to a user bookmark list. The user device may group the user bookmarks based on a domain. For example, the user device may group a webpage selling tents at REI® with a webpage selling a camp stove at REI® as both being a part of REI.com. The user device then may group the domains based on a descriptive entity data set associated with the websites. For example, the user device may receive from a search engine that REI.com and sportsbasement.com both are returned as answers for searches for camping gear. The user device then automatically may group REI.com and sportsbasement.com in the category of camping gear.

The user device may use a traditional file and folder structure or an association characteristic navigation structure. Previously, the traditional file and folder structure may lock a user bookmark into a specific disk storage structure in a specific category folder. Consequently, the traditional file and folder structure may lock the user bookmark into a specific presentation at a view layer of the user interface. FIG. 3a illustrates, in a block diagram, one embodiment of a traditional file and folder structure 300. The traditional file and folder tree structure 300 may group a user bookmark 310 representing a website according to a domain for the website in a domain folder 320. The traditional file and folder tree structure 300 then may group the domain folders 320 based upon a descriptive entity data set associated with the websites in the domain folders 320. The traditional file and folder tree structure 300 may store the grouped domain folders 320 in a sub-category folder 330. If the domain may be associated with multiple sub-categories, the user device may create different instances of the domain folder 320 containing those user bookmarks that match the sub-category. If the website may be associated with multiple categories, the user device may create multiple instances of the user bookmark for storage in those sub-category folders 330. The traditional file and folder tree structure 300 may further group the sub-category folders 330 to be stored in a category folder 340.

By contrast, by using an association characteristic navigation structure, the user may navigate the bookmark data more efficiently and accurately, improving user confidence in finding content. FIG. 3b illustrates, in a block diagram, one embodiment of an association characteristic navigation structure 350. The association characteristic navigation structure 350 may store the user bookmarks 310 representing favorite websites in a structure similar to a database, with each user bookmark 310 having a series of associated searchable characteristics. The association characteristic navigation structure 350 may associate each user bookmark 310 belonging to a domain with a domain tag 360. The association characteristic navigation structure 350 further may associate a user bookmark 310 with a category tag 370 based upon a descriptive entity data set associated with a website. The user device may navigate to the website in the user bookmark list using the association characteristic navigation structure 350. As opposed to with the file and folder structure 300, the association characteristic navigation structure 350 may access a single instance of a website bookmark 310 via multiple category tags 370.

FIG. 4 illustrates, in a block diagram, one embodiment of a user view 400 of a user bookmark list. The browser may present a user bookmark list as a category view 410 displaying a set of categories 412 to the user. Once the user selects a category 412, the browser may present a domain view 420 displaying a set of domains 422 associated with that category 412. The domain view 420 may order the domains 422 based on the category 412 selected, with the domain 422 most closely matching the category 412 at the top. Once the browser selects a domain 412, the browser may present a bookmark view 430 displaying a set of user bookmarks 432 at that domain 412. The bookmark view 430 may order the user bookmarks 432 based on the category 412 selected, with the user bookmark 432 most closely matching the category 412 at the top. The browser may filter the user bookmarks 432 shown at the bookmark view to show just the user bookmarks 432 at that domain 422 associated with the selected category 412.

For example, the user may wish to access a website to buy a camping stove. The user may activate a browser on a user device. The browser may group the user bookmarks representing websites the user has identified as user favorites in to categories 412 based on descriptive entity data sets for those websites for presentation in a category view 410. The category view 410 may present news, entertainment, sports, outdoor activities, shopping, and food. The user may select the category 412 shopping. The browser may present a list of domains 422 in the domain view 420. The domain view 420 may present REI.com, SportsBasement.com, Walmart.com, Target.com, Costco.com, and Macys.com. The user may select the domain 422 REI.com. The browser may present a list of user bookmarks 432 at the bookmark view 430. The bookmark view 430 may present a camping gear web page, an outdoor activity books page, a sports wear page, a cycling page, a snow sport page, and a water activities page. The browser may filter out a REI® web page listing outdoor classes. The user then may access the camping gear web page. The user device may update the descriptive entity data set for the camping gear web page at that time. The user alternately may reach the user bookmark 432 for the camping gear web page via the sports category 412, the outdoor activities category 412, or the food category 412. The browser may adjust the descriptive entity data set for a webpage based on the user path to the user bookmark 432.

The browser may adjust the descriptive entity data set for a webpage based on the user path to the user bookmark. The browser may maintain a bookmark record to track the bookmark usage history of a user. The browser may use that bookmark usage history to improve the categorization of the bookmarks. The browser may share the bookmark usage history with a search engine to improve the search engine performance. FIG. 5 illustrates, in a block diagram, one embodiment of a bookmark record 500. The bookmark record 500 may have a user identifier (ID) 510 identifying the user interacting with the browser. The bookmark record 500 may have a device identifier 520 identifying the device implementing the browser. The user device or the search engine may anonymize the bookmark record 500 when sharing with a search engine. The bookmark record 500 may have a website identifier 530 for the website the user browsed. The bookmark record 500 may have a domain identifier 540 for the domain associated with the website. The bookmark record 500 may have a descriptive entity data set 550 having one or more characteristic descriptors 552 describing aspects of the webpage. Each characteristic descriptor 552 may have a descriptor weight 554 indicating a percentage of the website covered or the accuracy of the characteristic descriptor 552. The bookmark record 500 may have a bookmark usage history 560 describing user interaction with a user bookmark list. The bookmark usage history 560 may indicate the user path, or categories and domains, most frequently used by the user to access the bookmark.

FIG. 6 illustrates, in a flowchart, one embodiment of a method 600 for saving a user bookmark. A user device may access a website, either via a search in a search engine, a user clicking a hyperlink, or by a user directly entering a website address (Block 602). The user device may receive a descriptive entity data set for the website formulated by the search engine, either from the search engine or from the website itself (Block 604). The user device may receive a user input indicating that the user wants to save the website as a user bookmark (Block 606). The user device may represent the website as a user bookmark (Block 608). The user device may associate the user bookmark with the descriptive entity data set (Block 610). The user device may receive one or more user category tags from the user indicating one or more preferred categories for the website from the user (Block 612). The user device may associate the user bookmark with the user category tag (Block 614). The user device may store the user bookmark list in a network storage (Block 616).

FIG. 7 illustrates, in a flowchart, one embodiment of a method 700 for grouping a user bookmark. The user device may receive a user input activating a presentation of the user bookmark list (Block 702). The user device may categorize the user bookmark in a user bookmark list of a user at a view layer based on the descriptive entity data set and, potentially, a user category tag upon each presentation of a user bookmark list to a user (Block 704). The user device may group the user bookmark list based on a domain of the website (Block 706). If a user category tag is associated with the user bookmark (Block 708), the user device may prioritize the user bookmark having a user category tag in a list order of the user bookmark list (Block 710). The user device may order user bookmarks in a category based on a descriptor weight (Block 712). The user device may present the user bookmark list to the user (Block 714).

FIG. 8 illustrates, in a flowchart, one embodiment of a method 800 for tracking a bookmark navigation. The user device may navigate to the user bookmark in the user bookmark list using an association characteristic navigation (Block 802). The user device may track a user path to the user bookmark in the user bookmark list to create a bookmark usage history (Block 804). The user device may store a user path to the user bookmark in a bookmark usage history (Block 806). The user device may weight a characteristic descriptor of a descriptive entity data set based on the bookmark usage history (Block 808). The user device may access the website represented by the user bookmark selected by the user (Block 810). The user device may update the descriptive entity data set for the user bookmark upon accessing the website (Block 812). The user device may anonymize the bookmark usage history for transmission to a search engine (Block 814). The user device may send the bookmark usage history to a search engine to update the data entity data set for the website (Block 816).

FIG. 9 illustrates, in a flowchart, one embodiment of a method 900 for updating a descriptive entity data set at the search engine. The search engine may receive a search request for a website type from a user device (Block 902). The search engine may send a set of responsive websites and an associated descriptive entity data set to the user device (Block 904). The search engine may receive a bookmark usage history from the user device (Block 906). The search engine may update the descriptive entity data set for the websites based on the bookmark usage history (Block 908).

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims.

Embodiments within the scope of the present invention may also include computer-readable storage media for carrying or having computer-executable instructions or data structures stored thereon. Such computer-readable storage media may be any available media that can be accessed by a general purpose or special purpose computer. By way of example, and not limitation, such computer-readable storage media can comprise RAM, ROM, EEPROM, CD-ROM or other optical disk storage, magnetic disk storage or other magnetic data storages, or any other medium which can be used to store desired program code means in the form of computer-executable instructions or data structures, as opposed to propagating media such as a signal or carrier wave. Computer-readable storage media explicitly does not refer to such propagating media. Combinations of the above should also be included within the scope of the computer-readable storage media.

Embodiments may also be practiced in distributed computing environments where tasks are performed by local and remote processing devices that are linked (either by hard-wired links, wireless links, or by a combination thereof) through a communications network.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Although the above description may contain specific details, they should not be construed as limiting the claims in any way. Other configurations of the described embodiments are part of the scope of the disclosure. For example, the principles of the disclosure may be applied to each individual user where each user may individually deploy such a system. This enables each user to utilize the benefits of the disclosure even if any one of a large number of possible applications do not use the functionality described herein. Multiple instances of electronic devices each may process the content in various possible ways. Implementations are not necessarily in one system used by all end users. Accordingly, the appended claims and their legal equivalents should only define the invention, rather than any specific examples given.

I claim:

1. A network browsing device, comprising:
   an input device configured to receive a user input identifying a website as a user bookmark;
   memory configured to associate the user bookmark corresponding to the website with a descriptive entity data set describing at least one aspect of the website;
   a processing core having at least one processor configured to categorize the user bookmark at a view layer based on the descriptive entity data set upon each presentation of a user bookmark list to a user, the user bookmark list including respective user bookmarks, each user bookmark being grouped into a user specified category based on the descriptive entity data set that describes the at least one aspect of the website; and an output device configured to present the user bookmark list to the user, wherein the processing core is further configured to:

prioritize the user bookmark having a user category tag in a list order of the user bookmark list, and order user bookmarks in a category based on a descriptor weight.

2. The network browsing device of claim 1, further comprising:
a communication interface configured to receive the descriptive entity data set formulated by a search engine.

3. The network browsing device of claim 1, further comprising:
a communication interface configured to receive an update to the descriptive entity data set for the user bookmark upon accessing the website.

4. The network browsing device of claim 1, wherein the processing core is further configured to group the user bookmark list based on a domain of the website.

5. The network browsing device of claim 1, further comprising:
a communication interface configured to store the user bookmark list in a network storage.

6. The network browsing device of claim 1, wherein the memory is further configured to associate the user bookmark with a user category tag.

7. The network browsing device of claim 1, wherein the processing core is further configured to navigate to the user bookmark in the user bookmark list using an association characteristic navigation.

8. The network browsing device of claim 1, wherein the memory is further configured to track a user path to the user bookmark in the user bookmark list to create a bookmark usage history.

9. The network browsing device of claim 1, wherein the memory is further configured to weight a characteristic descriptor based on a bookmark usage history.

10. The network browsing device of claim 1, wherein the processing core is further configured to order the respective user bookmarks in the user specified category based on a descriptor weight.

11. The network browsing device of claim 1, further comprising:
a communication interface configured to send a bookmark usage history to a search engine to update the descriptive entity data set for the website.

12. A computing device, having memory configured to store a user bookmark representing a website, the computing device configured to receive a descriptive entity data set for the website formulated by a search engine, the computing device further configured to associate the user bookmark with the descriptive entity data set, and the computing device also configured to categorize the user bookmark in a user bookmark list of a user, the user bookmark list including respective user bookmarks, each user bookmark being grouped into a user specified category based on the descriptive entity data set that describes at least one aspect of the website, and wherein the computing device is further configured to prioritize the user bookmark having a user category tag in a list order of the user bookmark list, and order user bookmarks in a category based on a descriptor weight.

13. The computing device of claim 12, wherein the computing device is further configured to categorize the respective user bookmarks at a view layer based on the descriptive entity data set upon each presentation of the user bookmark list to the user.

14. The computing device of claim 12, wherein the computing device is further configured to update the descriptive entity data set for the respective user bookmarks upon accessing the website.

15. The computing device of claim 12, wherein the computing device is further configured to group the user bookmark list based on a domain of the website.

16. The computing device of claim 12, wherein the computing device is further configured to associate the user bookmark with a user category tag.

17. The computing device of claim 12, wherein the computing device is further configured to navigate to the respective user bookmarks in the user bookmark list using an association characteristic navigation.

18. A machine-implemented method, comprising:
representing a website as a user bookmark;
receiving a descriptive entity data set for the website formulated by a search engine;
associating the user bookmark with the descriptive entity data set;
categorizing the user bookmark at a view layer based on the descriptive entity data set upon each presentation of a user bookmark list to a user;
presenting the user bookmark list to the user;
navigating to the user bookmark in the user bookmark list using an association characteristic navigation;
prioritizing the user bookmark having the user category tag in a list order of the user bookmark list; and
ordering user bookmarks in a category based on a descriptor weight,
wherein the user bookmark list includes respective user bookmarks, each user bookmark being grouped into a user specified category based on the descriptive entity data set that describes the at least one aspect of the website.

19. The method of claim 18, further comprising:
associating the website with a user category tag.

* * * * *